US008718646B2

(12) United States Patent
Chan et al.

(10) Patent No.: US 8,718,646 B2
(45) Date of Patent: May 6, 2014

(54) METHODS AND APPARATUS FOR DISTRIBUTED MULTIMEDIA CONTENT SUPPORTING USER MOBILITY

(75) Inventors: Mary S. Chan, Chatham, NJ (US); James W. McGowan, Whitehouse Station, NJ (US); Michael C. Recchione, Nutley, NJ (US)

(73) Assignee: Alcatel Lucent, Paris (FR)

( * ) Notice: Subject to any disclaimer, the term of this patent is extended or adjusted under 35 U.S.C. 154(b) by 1538 days.

(21) Appl. No.: 11/614,371

(22) Filed: Dec. 21, 2006

(65) Prior Publication Data

US 2008/0153460 A1   Jun. 26, 2008

(51) Int. Cl.
*H04W 36/00*   (2009.01)

(52) U.S. Cl.
USPC ............ 455/436; 455/437; 455/438; 455/439

(58) Field of Classification Search
USPC .................................................. 455/436–439
See application file for complete search history.

(56) References Cited

U.S. PATENT DOCUMENTS

| | | | |
|---|---|---|---|
| 6,907,225 B1 * | 6/2005 | Wilkinson | 455/41.2 |
| 7,423,963 B2 * | 9/2008 | Lee | 370/229 |
| 2003/0060190 A1 | 3/2003 | Mallart | |
| 2003/0093694 A1 | 5/2003 | Medvinsky | |
| 2003/0212764 A1 | 11/2003 | Trossen et al. | |
| 2004/0121763 A1 * | 6/2004 | Franceschini et al. | 455/414.1 |
| 2005/0102300 A1 | 5/2005 | Madsen | |
| 2005/0128995 A1 | 6/2005 | Ott | |
| 2006/0109820 A1 | 5/2006 | Miyata | |
| 2007/0123267 A1 * | 5/2007 | Whinnett et al. | 455/452.2 |
| 2008/0268907 A1 * | 10/2008 | Senarath et al. | 455/561 |
| 2008/0282295 A1 * | 11/2008 | Gabriel et al. | 725/62 |

FOREIGN PATENT DOCUMENTS

CN   1387043   12/2002

* cited by examiner

*Primary Examiner* — Marisol Figueroa
(74) *Attorney, Agent, or Firm* — Ryan, Mason & Lewis, LLP

(57) ABSTRACT

Methods and apparatus are provided for delivering content to a mobile terminal in a wireless network. A base station in a wireless network delivers content to a mobile terminal by determining if a packet from the mobile terminal contains a request for content; and delivering the content to the mobile terminal from the base station if the content is stored locally at the base station. The base station can optionally evaluate an authorization of the mobile terminal to receive the content. During a hand-off, the current base station determines if a packet received from the mobile terminal contains a base station change message indicating that the mobile terminal is switching to a new base station; and provides content status information (such as content position) to the new base station.

17 Claims, 3 Drawing Sheets

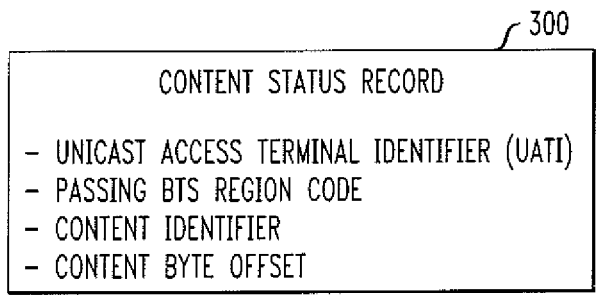
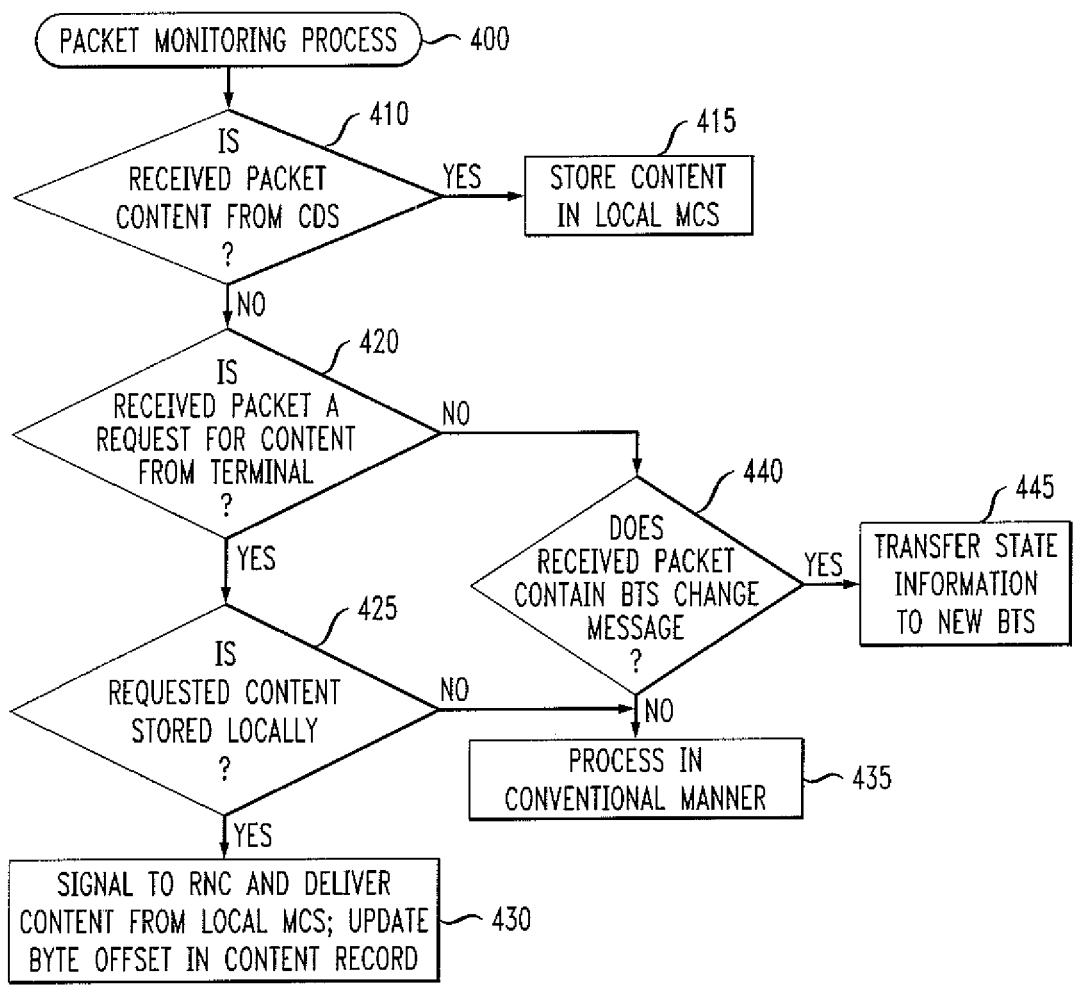

METHODS AND APPARATUS FOR DISTRIBUTED MULTIMEDIA CONTENT SUPPORTING USER MOBILITY

CROSS-REFERENCE TO RELATED APPLICATION

The present application is related to U.S. patent application Ser. No. 11/614,398, entitled "Methods and Apparatus for a Virtual Content Channel Structure in a Broadband Wireless Network with Location-Based Content," filed contemporaneously herewith, assigned to the assignee of the present invention and incorporated by reference herein.

FIELD OF THE INVENTION

The present invention relates generally to wireless communication techniques, and more particularly, to methods and apparatus for distributing multimedia content in a wireless network environment.

BACKGROUND OF THE INVENTION

Wireless networks are constantly evolving and many networks now offer significantly increased bandwidth relative to prior generations of wireless networks. Thus, a number of mobile service providers now offer traditional media broadcast services, similar to those offered by cable or satellite television service providers. For example, 1×Evolution-Data Optimized (EVDO) networks employ a wireless radio broadband data standard that has been adopted by a number of CDMA mobile telephone service providers in several countries, including the United States. The EVDO standard has been adopted by the 3rd Generation Partnership Project 2 (3GPP2) collaboration, as part of the CDMA2000 family of standards. Similarly, the Universal Mobile Telecommunications System (UMTS) is a competing standard that has been also been adopted by a number of mobile telephony service providers.

The wireless links in an EVDO network, for example, between the distributed base stations and the mobile terminals, provide sufficient bandwidth (for example, on the order of 50 Mbps) for such emerging media broadcast services. It is well known, however, that the "backhaul" portion of the EVDO networks that transports traffic between the distributed base station sites and the centralized portions of the EVDO network, such as the Radio Network Controller (RNC), is a bottleneck that currently does not provide sufficient bandwidth for such emerging media broadcast services. For example, in an EVDO network, the backhaul network is typically implemented using "Transmission Level 1" (T1) telecommunications lines, which typically support 24 calls of approximately 64 Kbps, for a total of 1.5 Mbps. Currently, mobile networks position multimedia content so that it must traverse the bandwidth-limited backhaul link. Thus, numerous T1 connections must be aggregated to support the evolving broadband media services.

In addition, unlike traditional networks, the user in a mobile architecture typically does not have a single point-of-contact with the network. Thus, the communication path to the user changes during the broadcast. On emerging wireless networks, the communication path from the network core to the user is expected to change frequently, for example, on the order of every few seconds, further complicating the ability to deliver broadband services to a mobile user.

A need therefore exists for methods and apparatus for wireless delivery of media content to a user in a wireless network without having to traverse the backhaul portion of the network. A further need exists for methods and apparatus for wireless delivery of media content to a user in a wireless network in such a way that the content is available along each user path.

SUMMARY OF THE INVENTION

Generally, methods and apparatus are provided for delivering content to a mobile terminal in a wireless network. According to one aspect of the invention, a base station in a wireless network delivers content to a mobile terminal by determining if a packet from the mobile terminal contains a request for content; and delivering the content to the mobile terminal from the base station if the content is stored locally at the base station. The base station can optionally also review packets to determine if they are received from a content server on the wireless network and contain content to be stored locally. In addition, the base station can optionally evaluate an authorization of the mobile terminal to receive the content.

According to a further aspect of the invention, a base station delivers content to a mobile terminal from a local content server over a wireless network by determining if a packet received from the mobile terminal contains a base station change message indicating that the mobile terminal is switching to a new base station; and providing content status information to the new base station. The content status information comprises one or more of a position within the content, an identifier of the content, an identifier of the base station and an identifier of the mobile terminal.

A more complete understanding of the present invention, as well as further features and advantages of the present invention, will be obtained by reference to the following detailed description and drawings.

BRIEF DESCRIPTION OF THE DRAWINGS

FIG. 3 is a sample table describing an exemplary implementation of a content status record incorporating features of the present invention; and FIG. 4 is a flow chart describing an exemplary implementation of a packet monitoring process incorporating features of the present invention.

DETAILED DESCRIPTION

The present invention provides methods and apparatus for wireless delivery of media content to a user in a wireless network without having to traverse the backhaul portion of the network. As previously indicated, there is a bottleneck in the backhaul portion of the network, so one aspect of the present invention locates the content closer to the user to avoid the bottleneck. In addition, as noted above, for wireless delivery of media content, the communication path to the user changes during the broadcast. Thus, according to a further aspect of the present invention, the user's location within the content is monitored and can be utilized during a hand-off to ensure continuous access to the media content along each user path.

In one exemplary implementation of the invention, one or more content servers are located between the mobile terminal and the backhaul link, for example, as part of, or co-located with, the Base Transceiver Stations (BTSs) communicating with the mobile terminal. A further aspect of the invention provides a mechanism to provide content to the content servers, either by caching previously transmitted content, or by intentionally pushing content to the content server(s) from a network-based repository. In a caching implementation, the content delivered by one BTS can optionally be cached at other BTSs in a region as well. In addition, a mechanism is provided between the mobile terminal and the backhaul link (again preferably related to the BTS) to determine that the requested content is locally stored, and directs the requested content to the mobile terminal. In order to permit the mobile terminal to connect to different BTSs throughout a call (based, for example, on signal strength measurements), information can be exchanged among BTSs regarding the user's state (for example, the user's position within the content).

Figure 1:
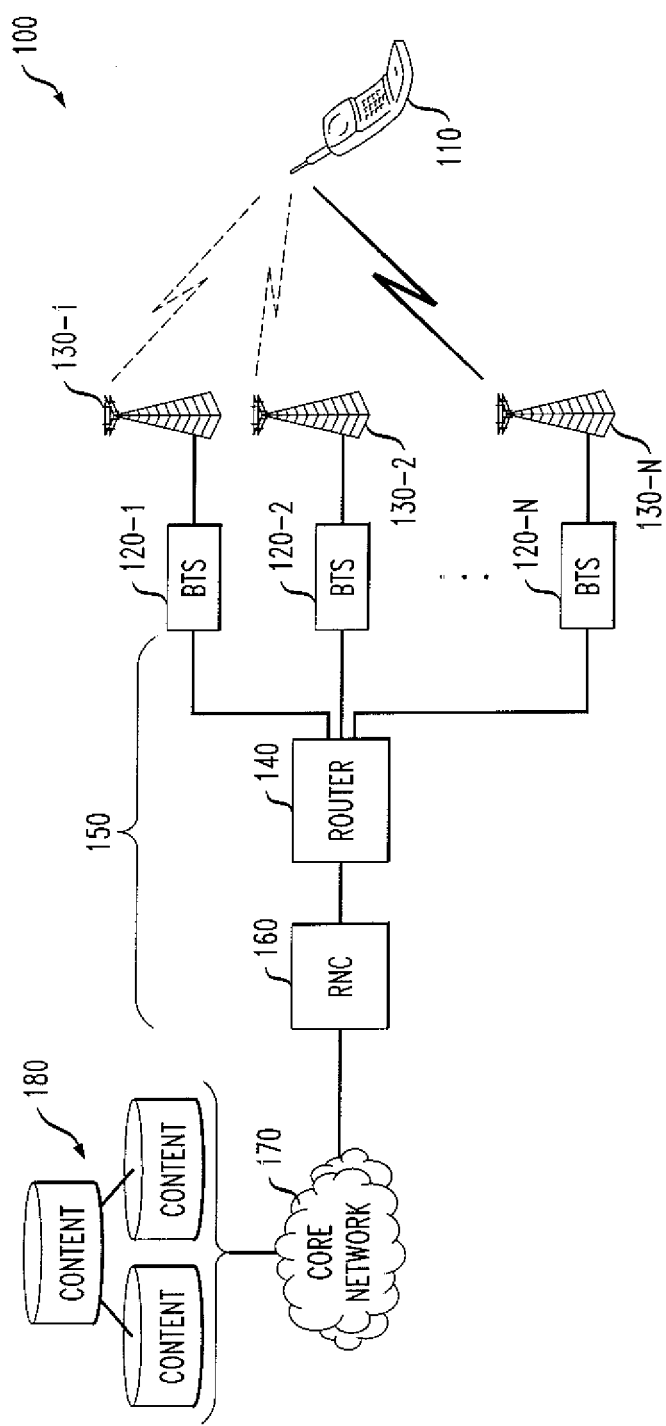
FIG. 1 illustrates a conventional wireless network environment.

FIG. 1 illustrates a conventional wireless network environment 100, based on an exemplary 1×EV-DO network implementation. As shown in FIG. 1, the wireless network environment 100 comprises one or more mobile terminals, such as the mobile terminal 110, having a wireless connection to a base transceiver station (BTS) 120-1 through 120-N. Each base station 120-1 through 120-N typically has an associated antenna 130-1 through 130-N to provide an air interface to the mobile terminals 110.

The mobile terminal 110 (also referred to as a terminal herein) may be implemented, for example, as a cellular telephone, a personal computer, laptop computer or another device that can establish a connection over a wireless network. The terminal 110 typically monitors the radio signal strength to several BTSs 120, in a known manner. Based on the strength of the signals associated with each possible path, a path is selected between the terminal 110 to the core network. As shown in FIG. 1, the BTSs 120 connect through a router 140 to a radio network controller (RNC) 160 to a core network (core) 170. As previously indicated, the backhaul link 150 that transports traffic between the distributed base stations 120 and the centralized radio network controller 160 is currently the bandwidth bottleneck between the core network 170 and the air interface to the terminals 110.

As shown in FIG. 1, the content server cluster 180 that stores the multimedia content is positioned so that it must traverse the bandwidth-limited backhaul link 150. The content cluster 180 is accessible through the core network 170, forcing the high bandwidth media to traverse this backhaul network 150 for each user, thereby limiting the number of users supported for media services.

Figure 2:
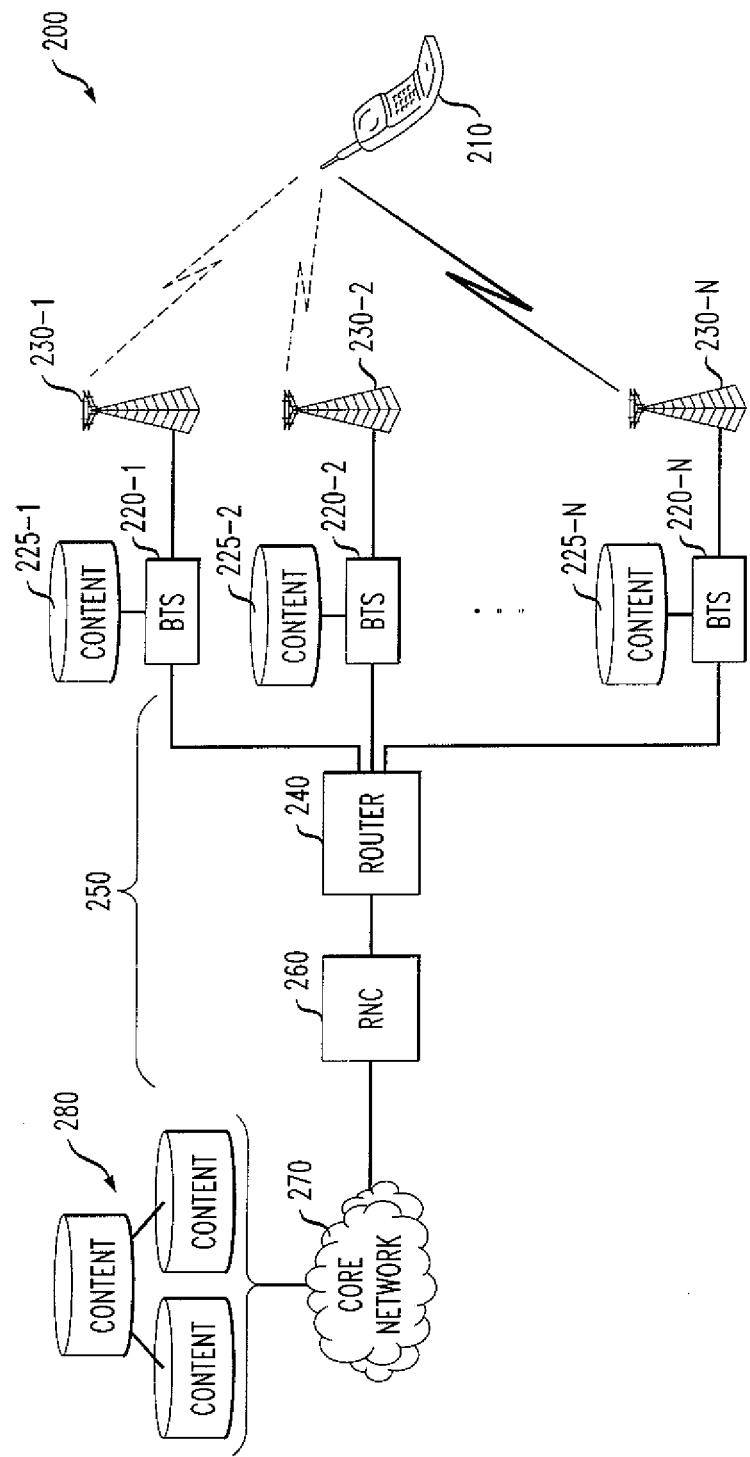
FIG. 2 illustrates an exemplary wireless network environment incorporating features of the present invention.

FIG. 2 illustrates an exemplary wireless network environment 200 incorporating features of the present invention. The exemplary wireless network environment 200 is based on the illustrative EVDO wireless network environment 100 of FIG. 1, as modified herein to provide the features and functions of the present invention. Thus, the elements of FIG. 2 perform in a similar manner to the corresponding elements of FIG. 1, unless otherwise indicated. While the present invention is illustrated herein in the context of an exemplary EVDO network, the present invention can be applied in any broadband wireless network implementation, such as UMTS, as would be apparent to a person of ordinary skill in the art.

According to one aspect of the invention, one or more mobile content servers, such as content servers 225-1 through 225-N, is now associated with each BTS 220-1 through 220-N. The content cluster 280 at the core network 270 typically remains, but its functionality is somewhat modified, as discussed herein. The content cluster 280 now serves as a content distribution server (CDS) to distribute the content to each mobile content server 225. The CDS 280 typically warehouses the media content in a location behind the backhaul link 250. The MCSs 225 mirror relevant sections of content in front of the backhaul link 250.

As discussed further below in conjunction with FIG. 4, the BTS 220 intercepts any request for content that is stored locally in the MCS 225, and distributes that content locally, avoiding the backhaul link 250. Some information, such as signaling information for authentication and billing information, may still be sent to the core 170. However, the present invention recognizes that the media itself contains the bulk of the traffic, and removing the media from the backhaul link 250 has the most significant impact on bandwidth.

According to a further aspect of the invention, information regarding the user's location within the content playback is optionally communicated from BTS to BTS when the user switches paths. Thus, if the desired content is available locally at a number of BTSs that can connect a terminal 210 to the wireless network 200, and the BTSs involved in a handoff communicate content status information as the mobile performs a handoff from one BTS to another, then the content is available along each of these user paths.

FIG. 3 is a sample content status record 300. Generally, the content status record 300 contains information regarding a user's place in the content and is transferred from the passing BTS to the recipient BTS during a hand-off. The exemplary record 300 includes a Unicast Access Terminal Identifier (UATI) that uniquely identifies the terminal, in a known manner; a region or local code for the passing BTS that specifies the "region" that the BTS inhabits; a content identifier and a byte offset within the identifier for the content that has been sent to the terminal.

Currently, during a hand-off, there is some information about the flow of content in the Radio Link Protocol (RLP) used between a mobile terminal 210 and the Radio Network Controller 260. Content is placed in numbered RLP packets by the RNC 260, and sent to the appropriate BTS 220 for delivery to the terminal 210. The BTS 220 will often build a large queue of RLP packets destined for the terminal 210. When the terminal 210 triggers a handoff from the original BTS 220 to a new BTS, the original BTS 220 informs the RNC 260 of the RLP packets that have been delivered. The RNC 260 then sends subsequent packets to the new BTS 220. For example, if the RNC 260 delivers RLP packets 101 through 110 to the old BTS and the terminal 210 sends a handoff notification after RLP packets 101-103 have been delivered, then the RNC 260 retransmits packets 104-110 to the new BTS 220.

Following a hand-off, and receipt of the content status record 300 from the passing BTS, the new BTS must check the second and third fields (region code and content identifier) for consistency. For example, if the passing BTS is at a geographic boundary that is not guaranteed to have identical content to the receiving BTS (such as driving from one country to the another), the new BTS must determine if its content is in fact identical to the identified content, and take appropriate action. For example, if the new BTS does not have the same content, a request should be sent to the core for the appropriate content.

For "live" content with no fixed size, such as traditional television, the byte offset in the fourth field of the content status record 300 is modified to a byte offset for a particular frame, and a fifth field can be added for a frame time which indicates the time each individual frame was broadcast (and is assumed that they are assigned elsewhere to broadcasted frames, such as by the MDS).

FIG. 4 is a flow chart describing an exemplary implementation of a packet monitoring process 400 incorporating features of the present invention. As shown in FIG. 4, the packet monitoring process 400 is initiated upon receipt of a packet. A test is performed during step 410 to determine if one or more received packets are content from the content distribution server 280. If it is determined during step 410 that the received packets contain content from the content distribution server 280, then the content is stored in the local media content server 225 during step 415.

If, however, it is determined during step 410 that the received packets are not content from the content distribution server 280, then a further test is performed during step 420 to determine if the received packet is a request for content from a terminal 210.

If it is determined during step 420 that the received packet is a request for content from a terminal 210, then a further test is performed during step 425 to determine if the requested content is stored locally. If it is determined during step 425 that the requested content is stored locally, then the BTS 220 signals to the RNC 260 that the content has been requested and delivers the content from the local media content server 225 during step 430. In addition, the BTS 220 updates the byte offset in the content record during step 430. The BTS 220 may also optionally determine if the mobile terminal 210 is authorized to receive the requested content. If, however, it is determined during step 425 that the requested content is not stored locally, then the packet is processed in a conventional manner during step 435.

If it was determined during step 420 that the received packet is not a request for content from a terminal 210, then a further test is performed during step 440 to determine if the received packet contains a BTS change message (i.e., a handoff is occurring). For example, a BTS change message may comprise a DSC message in accordance with the physical channel structure indicating, for example, that the mobile terminal 210 will retune to a new channel and BTS. The BTS change message may optionally include an indication of the last received packet, which may be used by the current BTS in the content status record 300 to notify the new BTS of the current content position.

If it is determined during step 440 that the received packet contains a BTS change message, then the content state information in the content state record 300 is transferred to the new BTS 220 during step 445. If, however, it is determined during step 440 that the received packet does not contain a BTS change message, then the packet is processed in a conventional manner during step 435.

As previously indicated, the present invention places content at the BTS 220 for delivery to the terminals 210. Thus, the RNC 260 is not packaging the content, and the RLP layer must be implemented in the BTS 220. Thus, the BTS 220 signals more than just which RLP packets have been delivered, but also some information about how the RLP numbering was assigned.

In a "uniflow" model implementation of the packet monitoring process 400, all content streams to the terminal 210 are placed in a single RLP stream. So, if the BTS 220 is serving video locally to the terminal 210, and there is simultaneously a voice call going through the core network, the two RLP streams need to be mixed into a single stream. It is noted that this is not required under a "multiflow" model, in which different streams to the terminal are placed in different RLP streams. In a uniflow model, the BTS can optionally bridge a network-facing RLP stream and a terminal-facing RLP stream, either by terminating both streams, or by renumbering streams from the network (and to renumber the associated requests for retransmission of lost RLP packets that don't make it to the terminal 210). In this manner, the BTS 220 makes it look to the RNC 260 and terminal 210 that they are communicating directly. In a multiflow model, the BTS 220 can pass the network RLP streams unmodified.

In a further variation, an RNC proxy can be created that acts to relay RLP numbering information across the backhaul link 250, but does not actually place content in RLP packets. This would require a special RNC proxy protocol for exchanging information between the BTS 220 and the RNC 260. If appropriate state information is stored in the proxy RNC, however, there does not need to be BTS to BTS communication regarding the current state. The RNC proxy can also be used to store an offset from a marker in the content (such as the beginning or some offset from the beginning), that can then be communicated to the BTS receiving the handoff.

System and Article of Manufacture Details

As is known in the art, the methods and apparatus discussed herein may be distributed as an article of manufacture that itself comprises a computer readable medium having computer readable code means embodied thereon. The computer readable program code means is operable, in conjunction with a computer system, to carry out all or some of the steps to perform the methods or create the apparatuses discussed herein. The computer readable medium may be a recordable medium (e.g., floppy disks, hard drives, compact disks, or memory cards) or may be a transmission medium (e.g., a network comprising fiber-optics, the world-wide web, cables, or a wireless channel using time-division multiple access, code-division multiple access, or other radio-frequency channel). Any medium known or developed that can store information suitable for use with a computer system may be used. The computer-readable code means is any mechanism for allowing a computer to read instructions and data, such as magnetic variations on a magnetic media or height variations on the surface of a compact disk.

The computer systems and servers described herein each contain a memory that will configure associated processors to implement the methods, steps, and functions disclosed herein. The memories could be distributed or local and the processors could be distributed or singular. The memories could be implemented as an electrical, magnetic or optical memory, or any combination of these or other types of storage devices. Moreover, the term "memory" should be construed broadly enough to encompass any information able to be read from or written to an address in the addressable space accessed by an associated processor. With this definition, information on a network is still within a memory because the associated processor can retrieve the information from the network.

It is to be understood that the embodiments and variations shown and described herein are merely illustrative of the principles of this invention and that various modifications may be implemented by those skilled in the art without departing from the scope and spirit of the invention.

We claim:

1. A method performed by a base station in a wireless network for delivering content to a mobile terminal, comprising:
   determining if a packet from said mobile terminal contains a request for content;
   delivering said content to said mobile terminal from said base station if said content is stored locally at said base station;
   providing content status information to a new base station, wherein said content status information identifies an offset location of a data element within said content, wherein said content status information further comprises a region code and a content identifier so that the new base station can determine whether content stored by the new base station is identical to the identified content; and providing numbering information to said new base station indicating a packet assignment for said content delivered to said mobile terminal from said base station.

2. The method of claim 1, further comprising the step of determining if a packet is received from a content server on said wireless network containing content to be stored locally.

3. The method of claim 1, further comprising the step of determining if a packet received from said mobile terminal contains a base station change message indicating that said mobile terminal is switching to said new base station.

4. The method of claim 1, further comprising the step of notifying an administrative node in said wireless network of the content delivery.

5. The method of claim 1, further comprising the step of evaluating an authorization of said mobile terminal to receive said content.

6. The method of claim 1, further comprising the step of renumbering one or more packets associated with said content.

7. A method performed by a base station delivering content to a mobile terminal from a local content server over a wireless network, comprising:
    determining if a packet received from said mobile terminal contains a base station change message indicating that said mobile terminal is switching to a new base station;
    providing content status information to said new base station, wherein said content status information identifies an offset location of a data element within said content, wherein said content status information further comprises a region code and a content identifier so that the new base station can determine whether content stored by the new base station is identical to the identified content; and
    providing numbering information to said new base station indicating a packet assignment for said content delivered to said mobile terminal from said base station.

8. The method of claim 7, wherein said content status information comprises an identifier of said content.

9. The method of claim 7, wherein said content status information comprises an identifier of said base station.

10. The method of claim 7, wherein said content status information comprises an identifier of said mobile terminal.

11. A base station in a wireless network for delivering content to a mobile terminal, the base station comprising:
    a memory; and
    at least one processor, coupled to the memory, operative to:
    determine if a packet from said mobile terminal contains a request for content;
    determine if said content is stored locally at said base station;
    deliver said content to said mobile terminal if said content is stored locally at said base station;
    provide content status information to a new base station, wherein said content status information identifies an offset location of a data element within said content, wherein said content status information further comprises a region code and a content identifier so that the new base station can determine whether content stored by the new base station is identical to the identified content; and
    provide numbering information to said new base station indicating a packet assignment for said content delivered to said mobile terminal from said base station.

12. The base station of claim 11, processor is further configured to determine if a packet is received from a content server on said wireless network containing content to be stored locally.

13. The base station of claim 11, processor is further configured to determine if a packet received from said mobile terminal contains a base station change message indicating that said mobile terminal is switching to said new base station.

14. The base station of claim 11, processor is further configured to evaluate an authorization of said mobile terminal to receive said content.

15. The base station of claim 11, processor is further configured to renumber one or more packets associated with said content.

16. A base station that delivers content to a mobile terminal from a local content server over a wireless network, the base station comprising:
    a memory; and
    at least one processor, coupled to the memory, operative to:
    determine if a packet received from said mobile terminal contains a base station change message indicating that said mobile terminal is switching to a new base station;
    provide content status information to said new base station, wherein said content status information identifies an offset location of a data element within said content, wherein said content status information further comprises a region code and a content identifier so that the new base station can determine whether content stored by the new base station is identical to the identified content; and
    provide numbering information to said new base station indicating a packet assignment for said content delivered to said mobile terminal from said base station.

17. The base station of claim 16, wherein said content status information comprises one or more of an identifier of said content, an identifier of said base station and an identifier of said mobile terminal.

* * * * *